(12) United States Patent
Tabares

(10) Patent No.: US 10,778,603 B2
(45) Date of Patent: Sep. 15, 2020

(54) SYSTEMS AND METHODS FOR CONTROLLING ACCESS TO BROKER RESOURCES

(71) Applicant: Citrix Systems, Inc., Fort Lauderdale, FL (US)

(72) Inventor: Modesto Tabares, Weston, FL (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 16 days.

(21) Appl. No.: 16/157,472

(22) Filed: Oct. 11, 2018

(65) Prior Publication Data

US 2020/0120039 A1 Apr. 16, 2020

(51) Int. Cl.
*H04L 12/911* (2013.01)
*H04L 29/06* (2006.01)

(52) U.S. Cl.
CPC ............ *H04L 47/783* (2013.01); *H04L 63/10* (2013.01); *H04L 2209/38* (2013.01)

(58) Field of Classification Search
CPC ............................................... H04L 63/10–108
See application file for complete search history.

(56) References Cited

U.S. PATENT DOCUMENTS

| | | | | |
|---|---|---|---|---|
| 10,194,320 B1 * | 1/2019 | Egner | ................ | G06Q 20/3223 |
| 10,299,128 B1 * | 5/2019 | Suthar | ...................... | H04L 9/30 |
| 10,505,718 B1 * | 12/2019 | Suthar | ..................... | H04L 12/14 |
| 2013/0219468 A1 * | 8/2013 | Bell | ....................... | H04L 63/10 726/4 |
| 2017/0310653 A1 * | 10/2017 | Zhang | ................... | H04L 9/0637 |
| 2017/0331810 A1 * | 11/2017 | Kurian | ................... | H04L 63/083 |
| 2018/0300679 A1 * | 10/2018 | Mahmood | ........... | H04L 63/0876 |
| 2018/0367298 A1 * | 12/2018 | Wright | .................. | H04L 9/0861 |
| 2018/0367528 A1 * | 12/2018 | Schwarz | ............. | H04L 63/0807 |
| 2019/0036887 A1 * | 1/2019 | Miller | ...................... | G07C 9/20 |
| 2019/0036906 A1 * | 1/2019 | Biyani | ................... | H04L 63/20 |
| 2019/0036932 A1 * | 1/2019 | Bathen | .................. | H04L 9/3231 |
| 2019/0050541 A1 * | 2/2019 | Wright | .............. | G06Q 20/3829 |
| 2019/0058697 A1 * | 2/2019 | Chang | ................. | H04L 63/0428 |
| 2019/0116142 A1 * | 4/2019 | Chalakudi | ........... | H04L 67/1097 |
| 2019/0124146 A1 * | 4/2019 | Austin | .................. | H04L 9/0643 |
| 2019/0147532 A1 * | 5/2019 | Singh | ..................... | G06N 20/00 705/35 |
| 2019/0163887 A1 * | 5/2019 | Frederick | ................ | G06F 21/64 |
| 2019/0164137 A1 * | 5/2019 | Vincent | ................ | G06Q 20/065 |
| 2019/0164150 A1 * | 5/2019 | Lee | ........................ | G06Q 20/42 |
| 2019/0165930 A1 * | 5/2019 | Castinado | ............. | H04L 63/123 |
| 2019/0165932 A1 * | 5/2019 | Vincent | ................ | G06Q 20/065 |
| 2019/0166133 A1 * | 5/2019 | Frederick | .............. | H04L 63/061 |
| 2019/0172057 A1 * | 6/2019 | Vincent | ................ | G06Q 20/382 |

(Continued)

*Primary Examiner* — Emmanuel L Moise
*Assistant Examiner* — Julian Chang
(74) *Attorney, Agent, or Firm* — Fox Rothschild LLP; Robert J. Sacco; Carol E. Thorstad-Forsyth

(57) ABSTRACT

Systems and methods for controlling access to broker resources. The methods comprising: receiving, by a client device from a broker server, a list of broker resources that a user is permitted to access and blockchain information for connecting with each broker resource of the list; detecting when the broker server become unavailable; and using the blockchain information to control connection establishment between the client device and at least a first resource of the broker resources in the list while the broker server is unavailable.

22 Claims, 7 Drawing Sheets

(56) References Cited

U.S. PATENT DOCUMENTS

| | | | | |
|---|---|---|---|---|
| 2019/0180276 | A1* | 6/2019 | Lee | H04L 63/10 |
| 2019/0182257 | A1* | 6/2019 | Lee | G06Q 10/06315 |
| 2019/0197532 | A1* | 6/2019 | Jayachandran | H04L 9/3239 |
| 2019/0207750 | A1* | 7/2019 | Harvey | H04L 9/0637 |
| 2019/0207751 | A1* | 7/2019 | Harvey | H04L 9/0643 |
| 2019/0215149 | A1* | 7/2019 | Ramasamy | H04L 67/1036 |
| 2019/0245856 | A1* | 8/2019 | Irwan | H04L 63/105 |
| 2019/0251552 | A1* | 8/2019 | Kurian | H04L 9/3247 |
| 2019/0268139 | A1* | 8/2019 | Kurian | G06F 21/602 |
| 2019/0268153 | A1* | 8/2019 | Kurian | H04L 9/3247 |
| 2019/0268284 | A1* | 8/2019 | Karame | H04L 47/828 |
| 2019/0303882 | A1* | 10/2019 | Purushothaman | G06Q 10/20 |
| 2019/0303893 | A1* | 10/2019 | Ramasamy | G06K 7/1417 |
| 2019/0303939 | A1* | 10/2019 | Kurian | G06Q 20/382 |
| 2019/0304038 | A1* | 10/2019 | Purushothaman | H04L 9/3239 |
| 2019/0305967 | A1* | 10/2019 | Hamel | H04L 9/3263 |
| 2019/0306230 | A1* | 10/2019 | Purushothaman | H04L 9/3247 |
| 2019/0333030 | A1* | 10/2019 | Ramasamy | H04L 9/0637 |
| 2019/0334912 | A1* | 10/2019 | Sloane | G06F 21/604 |
| 2019/0375373 | A1* | 12/2019 | Pepe | B60R 25/209 |
| 2020/0007322 | A1* | 1/2020 | Weldemariam | H04L 9/3231 |

* cited by examiner

SYSTEMS AND METHODS FOR CONTROLLING ACCESS TO BROKER RESOURCES

BACKGROUND

Statement of the Technical Field

The present disclosure relates generally to computing systems. More particularly, the present disclosure relates to implementing systems and methods for controlling access to broker resources.

Description of the Related Art

In a broker-based system for connecting client devices to server resources (e.g., a desktop virtualization platform such as Virtual Apps and Desktops available from Citrix Systems of Fort Lauderdale, Fla.), the broker device tends to act as the source of trust that validates a client device's authorization to connect to a given resource. When the broker device is in the cloud, there is a desire to allow client devices to connect to the server resources even if the cloud-based broker device is not available. With the broker device is offline, the following two issues are introduced: (1) how are authorizations stored for use at connection time without needing to introduce an additional component dedicated to storage; and (2) how can the client device and server resources (e.g., a receiver and a Virtual Desktop Agent ("VDA")) trust each other in the absence of the centralized source of trust (e.g., a broker device).

SUMMARY

The present disclosure concerns implementing systems and methods for controlling access to broker resources. The methods comprise: requesting a list of broker resources by a client device from a broker server; receiving, by the client device from the broker server, the list of broker resources that a user is permitted to access and blockchain information for connecting with each broker resource of the list; detecting when the broker server is unavailable; and/or using the blockchain information to control connection establishment between the client device and at least a first resource of the broker resources in the list while the broker server is unavailable. When the broker server once again becomes available, the broker server can perform operations to control the connection establishment between the client device and at least the first resource of the broker resources in the list.

In some scenarios, the blockchain information includes, but is not limited to, at least one identifier for a transaction block of a blockchain which includes information about the broker resources which the user is permitted to use. The list of broker resources and blockchain information are stored locally in the client device.

In those or other scenarios, the broker server updates the blockchain ledger to add transaction data to a transaction block in a blockchain, generate a hash for the transaction block, and create a new transaction block in the blockchain that includes the hash for the transaction block to which the transaction data was added. The transaction data comprises resource identifiers for the broker resources of the list, a user identifier for the user, user permissions for the broker resources of the list, use authorization durations for the broker resources of the list, and instructions how to establish a connection between the client device and each of the broker resources of the list.

The connection establishment is controlled by: communicating a connection request from the client device to the first resource along with an identifier for a transaction block of a blockchain including the broker server's authorization for the client device to connect to the broker resource; and accessing a blockchain ledger stored in a remote datastore to determine of an action being requested is authorized by contents of the transaction block associated with the identifier at a present time. The connection is established between the client device and the first resource when a determination is made that the action being requested is authorized by contents of the transaction block associated with the identifier at a present time.

BRIEF DESCRIPTION OF THE DRAWINGS

The present solution will be described with reference to the following drawing figures, in which like numerals represent like items throughout the figures.

DETAILED DESCRIPTION

Figure 1:
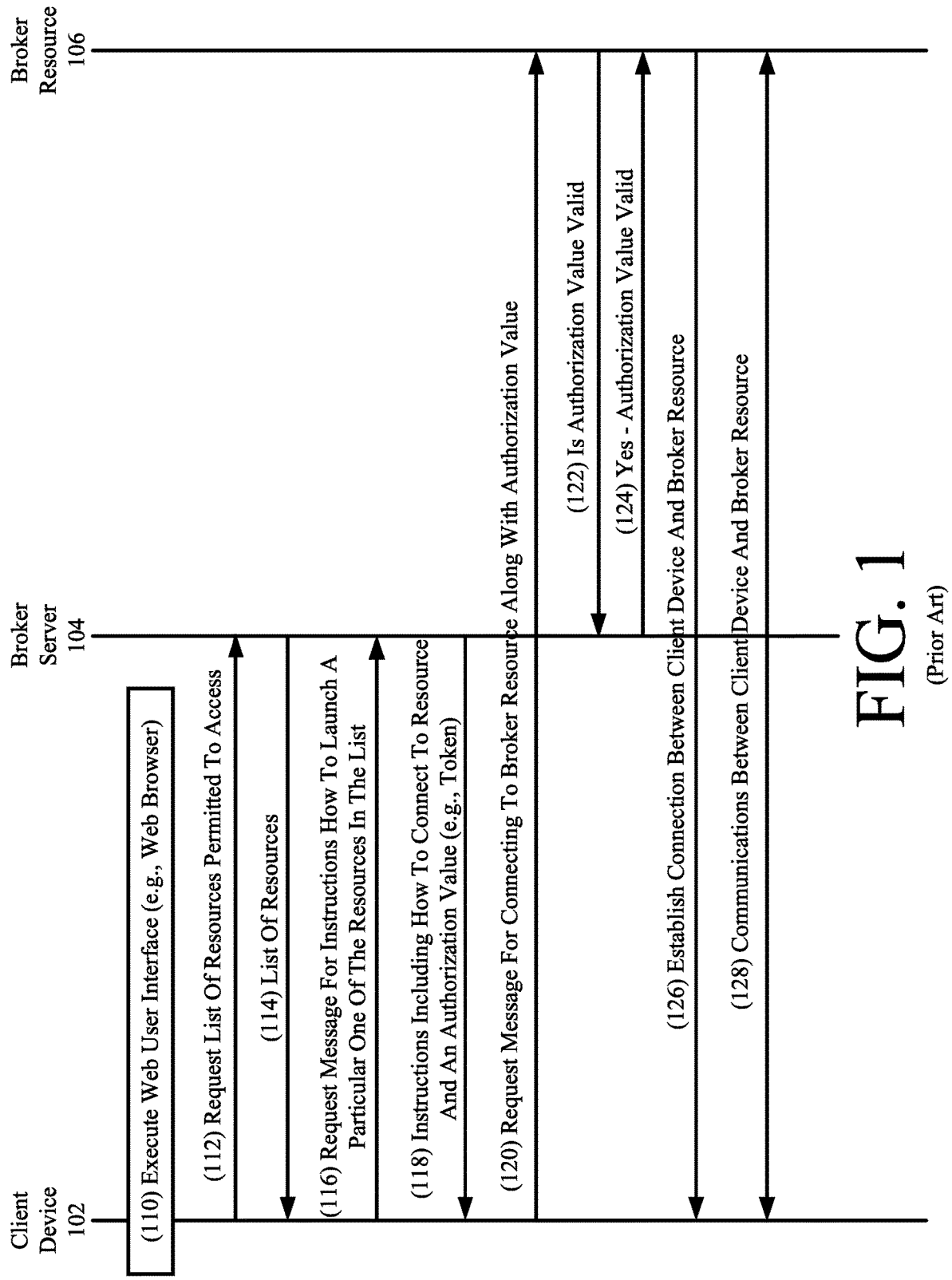
FIG. 1 is a message flow that is useful for understanding broker based control of a user's access to broker resources.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In a broker-based system for connecting client devices to server resources (e.g., a desktop virtualization platform such Virtual Apps and Desktops available from Citrix Systems of Fort Lauderdale, Fla.), the broker server tends to act as the source of trust that validates a client device's authorization to connect to a given broker resource. With reference to FIG. 1, a message flow is provided that is useful for understanding broker based control of a user's access to broker resources. First, a client device 102 executes a Web User Interface ("WUI") such as a web browser, as shown by 110. In 112, the client device 102 communicates a request for a list of references that its user is permitted to access. The broker server 104 generates the requested list and communicates the same to the client device in 114. Thereafter in 116, the client device sends a request message for instructions how to launch a particular one of the broker resources identified in the list to the broker server 104. In 118, the broker server 104 provides the requested instructions to the client device 102 along with an authorization value (e.g., a token). Upon receipt of the instructions, the client device 102 sends a connection request message to the broker resource 106. This request message is sent along with the authorization value (e.g., token). The broker resource 106 communicates with the broker server 104 in 122 to determine if the authorization value is valid. If so, the broker server 104 notifies the broker resource 106 of this fact as shown by 124. Next in 126, a connection is established between the broker resource 106 and the client device 102. Once this connection is established, the client device 102 and broker resource 106 communicate with each other as shown by 128.

Notably, the broker device 104 is hosted on a remote server (e.g., "in the cloud"). As such, there is a desire to allow the client device 102 to connect to the broker resource 106 even if the cloud-based broker device 104 is not available (e.g., is offline). With the broker device 104 is not available, the following two issues arise: (1) how are authorizations stored for use at connection time without needing to introduce an additional component dedicated to storage; and (2) how can the client device and broker resources (e.g., a receiver and a VDA) trust each other in the absence of the centralized source of trust (e.g., a broker device).

The present solution addresses these two issues that arise when the broker device is unavailable (e.g., offline). In this regard, the present solution generally concerns systems and methods for decentralized storage and validation of connection leases leveraging blockchain as a foundation. The term "blockchain", as used herein, refers to a digital ledger in which transactions made between two parties are recorded chronologically, publically, efficiently and in a verifiable and permanent way. The digital ledger defines a cryptographically secure chain of transaction blocks. Each record in the digital ledger comprises a transaction block. Each transaction block contains a cryptographic hash of the previous transaction block, a timestamp, and/or transaction data (generally represented as a merkle tree root hash). In this way, the transaction blocks cannot be altered retroactively without the alteration of all subsequent truncation blocks and the consensus of the network. By implementing blockchain technology in a novel way, the present solution allows for pre-established client-server authorizations to be available for validation and for the validation itself in scenarios where (1) a broker is not available (e.g., offline or unreachable) and (2) it is desirable to allow a client device (e.g., a receiver) to still connect to a broker resource (e.g., a VDA). As such, the present solution is applicable in scenarios where it is desirable to allow client devices to connect to a resource without needing to provide a centralized storage and trust validation mechanism for the authorizations.

In some scenarios, the present solution eliminates a need to introduce another component co-located with the broker resource (e.g., VDA) for the sole purpose of storing and validating authorizations. Not having to introduce this resource is highly desirable in a Desktop-as-a-service ("DaaS") and XA Essentials scenario where it is key to keep costs down.

The present solution can be thought of as an application of crypto-currency to connection leases (e.g., a connection lease is a currency). The client holds currency representing the ability/authorization to connect to a resource. When the client connects, it "pays" or "sends" the currency to the broker resource that it is connecting to. The broker resource has a mechanism to determine that the currency/payment is valid.

Figure 2:
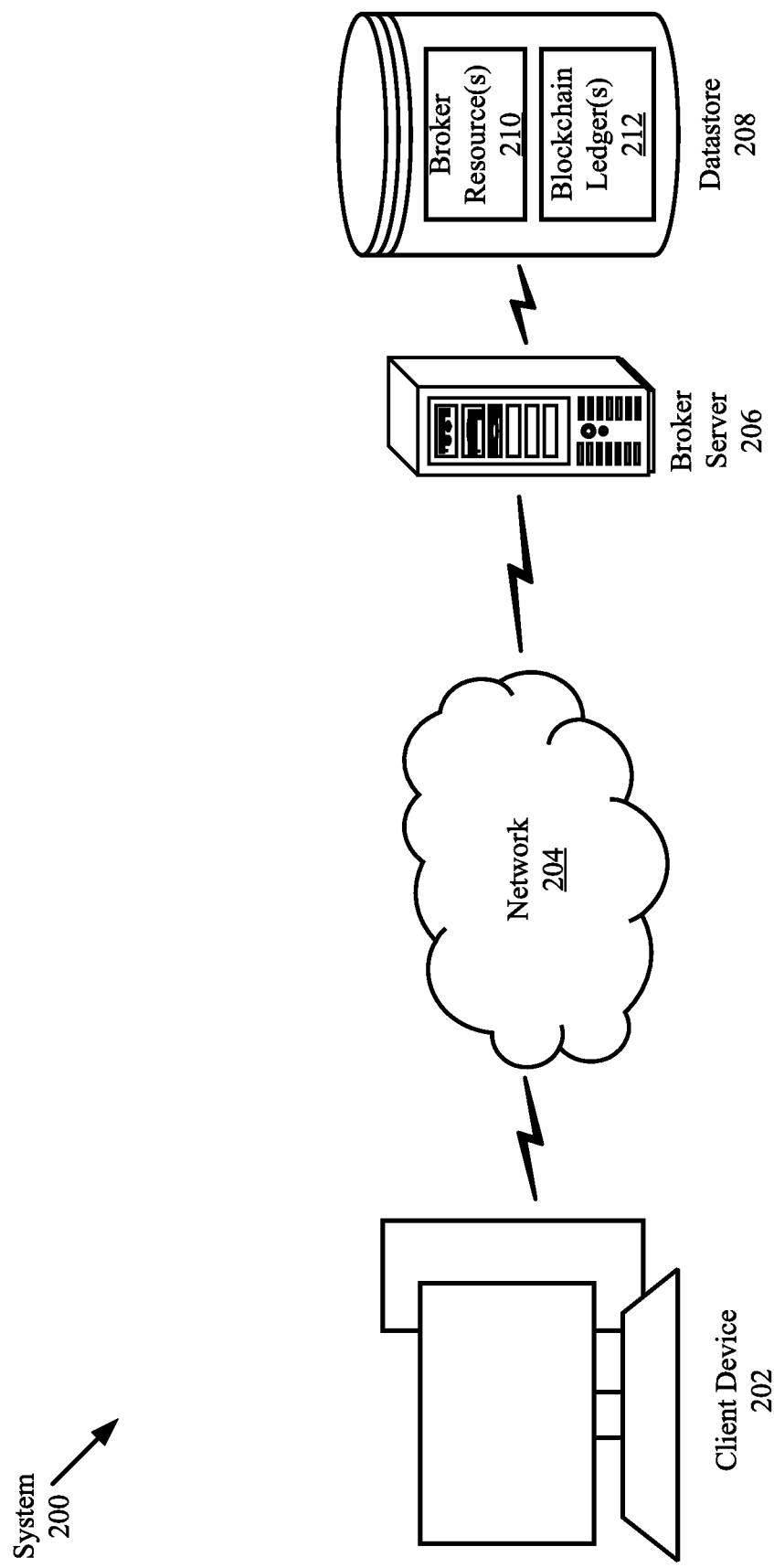
FIG. 2 is an illustration of an illustrative system.

Referring now to FIG. 2, there is provided an illustration of an illustrative system 200. System 200 comprises a client device 202, a broker sever 206 and a datastore 208. The client device 202 can include, but is not limited to, a personal computer, a desktop computer, a laptop computer, a smart device, a tablet and/or a personal digital assistant. The client device 202 is communicatively coupled to the broker server 206 via a network 204 (e.g., the Internet).

The broker server 206 is generally configured to control the client device's access to broker resource(s) 210 as described above in relation to FIG. 1, when online. The broker resources include, but are not limited to, Web sites, Web pages, documents, cloud based services, virtual desktops, virtualization platforms, and/or VDAs. In some scenarios, the broker server 206 can go offline or become unavailable for various reasons, such as for maintenance reasons. When this occurs, a blockchain technique is used by system 100 to continue to allow the client device's connection to the broker resource(s) 210.

The blockchain technique addresses the following two issues: how can an authorization presented by the client device 202 be validated without having to consult another party for trust; and where/how are the client-server authorizations stored in a way that does not require a resource or host dedicated to said storage. The first issue is addressed by leveraging blockchain as a foundation. In some scenarios, each block of a blockchain represents a set of client authorizations for a particular broker resource or a set of broker resources. For instance, a client's authorization to connect to the applications in a XD Delivery Group could be contained in the block. The block can also contain the connection lease itself including the connectivity details for the VDA resource. When the VDA resource needs to validate an authorization presented by the client device 202, it is a matter of validating that the authorization exists in the blockchain. The second issue is addressed by building a distributed storage layer that allows the updated blockchain to be available to all broker resources in the network. Ethereum's DApp model is an example of how this can be accomplished. With these items in place, a broker resource 210 (e.g., a VDA) has access to a distributed database of authorization/leases 212 and a mechanism to validate them without having to rely on a third party or any challenge exchange.

Figure 3:
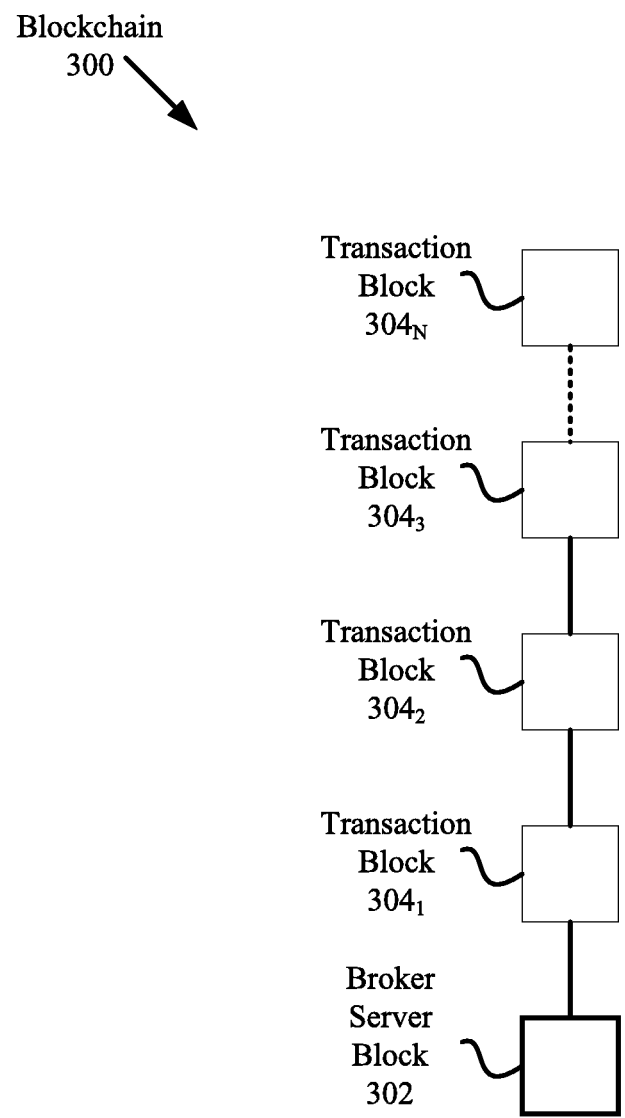
FIG. 3 is an illustration of an illustrative blockchain.
Figure 4:
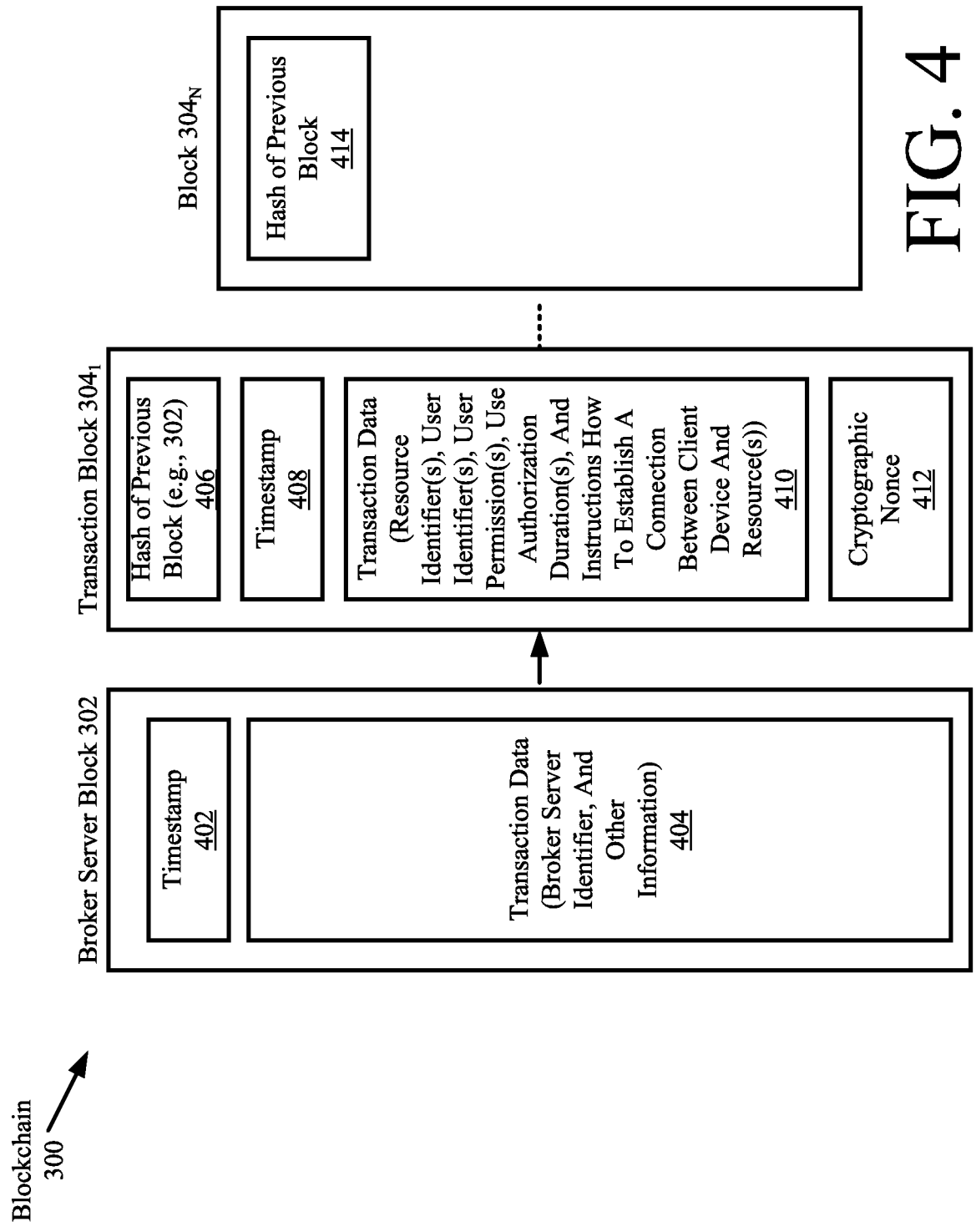
FIG. 4 is an illustration that is useful for understanding the blockchain of FIG. 3.

In order to fully understand the blockchain technique of the present solution, the particulars of an illustrative blockchain will now be described in relation to FIGS. 3-4. As shown in FIG. 3, the blockchain 300 provides a digital ledger in which transactions made between the client device 202 and the broker server 206 are recorded chronologically, publically, efficiently and in a verifiable and permanent way. The digital ledger is stored in a datastore 208 as blockchain ledger 212. The digital ledger 212 defines a cryptographically secure chain of blocks 300. The blocks include a broker server block 302 and a plurality of transaction blocks $304_1$, $304_2$, $304_3$, . . . , $304_N$ (collectively referred to as "304"). Each transaction block 304 provides a record of a respective transaction between the client device 202 and the broker server 206. For example, transaction block $304_1$ provides a record for a first transaction between the client device 202 and the broker server 206. Transaction block $304_2$ provides a record for a second transaction between the client device 202 and the broker server 206. Transaction block $304_3$ provides a record for a third transaction between the client device 202 and the broker server 206, and so on. The present solution is not limited to the particulars of this example. As shown in FIG. 4, the broker server block 302 comprises a timestamp 402 and transaction data 404. The timestamp 402 indicates a time of the block's creation. The transaction data 404 can include, but is not limited to, a broker server identifier and/or any other information relating to the operation of the broker server.

The transaction block $304_1$ includes, but is not limited to, a hash of the previous block (e.g., in this scenario 302) 406, a timestamp 408, transaction data 410 and a cryptographic nonce 412. Notably, each of the other transaction blocks 304 (except for the last transaction block $304_N$) also includes a hash of a previous block (e.g., block $304_2$ includes a hash of block $304_1$, and block $304_3$ includes a hash of block $304_2$, etc.), a timestamp, transaction data, and a cryptographic nonce. The timestamp includes a time of a respective transaction between the client device 202 and the broker server 206. The transaction data 410 includes, but is not limited to, resource identifier(s), user identifier(s), user permission(s), user authorization duration(s) (e.g., six hours), and instructions how to establish a connection between the client device client device 202 and the broker resource(s) 210. The cryptographic nonce 412 is an arbitrary number that can be used just once so as to ensure that the blocks cannot be altered retroactively without the alteration of all subsequent blocks and the consensus of the network.

The last transaction block $304_N$ in the blockchain 300 only includes a hash of the previous block (e.g., block $304_{N-1}$) 414, a time stamp (not shown) and/or a cryptographic nonce (not shown). It does not originally include transaction data. Transaction data is added to the block $304_N$ by the broker server 206 when a new transaction is performed between the client device 202 and the broker server 206. The new transaction can include (A) giving new permissions to a user for accessing one or more broker resources for a defined period of time and/or (B) revoking permissions from the user for accessing one or more broker resources. When this modification to transaction block $304_N$ occurs, a new transaction block $304_{N+1}$ (not shown in FIGS. 3-4) is created which includes the hash of transaction block $304_N$.

Hash values and timestamps are well known in the art. Algorithms for generating hash values and timestamps are also well known in the art, and therefore will not be described herein. Any known or to be known hash algorithm or method for generating a timestamp can be used herein without limitation to generate hashes 402 of the transaction blocks and timestamps 404 for record creation.

The timestamps 404 can be used to determine when a specified period of time in which the user is permitted to access one or more broker resources has expired. For example, the timestamp 404 has a value of 9 AM. The user is permitted to use a given broker resource or a given set of broker resources for six hours. Accordingly, the user is permitted access to the given broker resource(s) at any time between 9 AM and 3 PM. After 3 PM, the user is no longer permitted access to the given broker resource(s) unless a new transaction is performed between the client device 202 and the broker server 206 in which new permissions are given to the user. In this case, the broker server 206 modifies the last transaction block $304_N$ of the blockchain 300 to include transaction data for the new permissions, as well as adds a new transaction block $304_{N+1}$ (not shown in FIGS. 3-4) to the end of the blockchain 300 including the hash of the transaction block $304_N$. The present solution is not limited to the particulars of this example.

Figure 5:
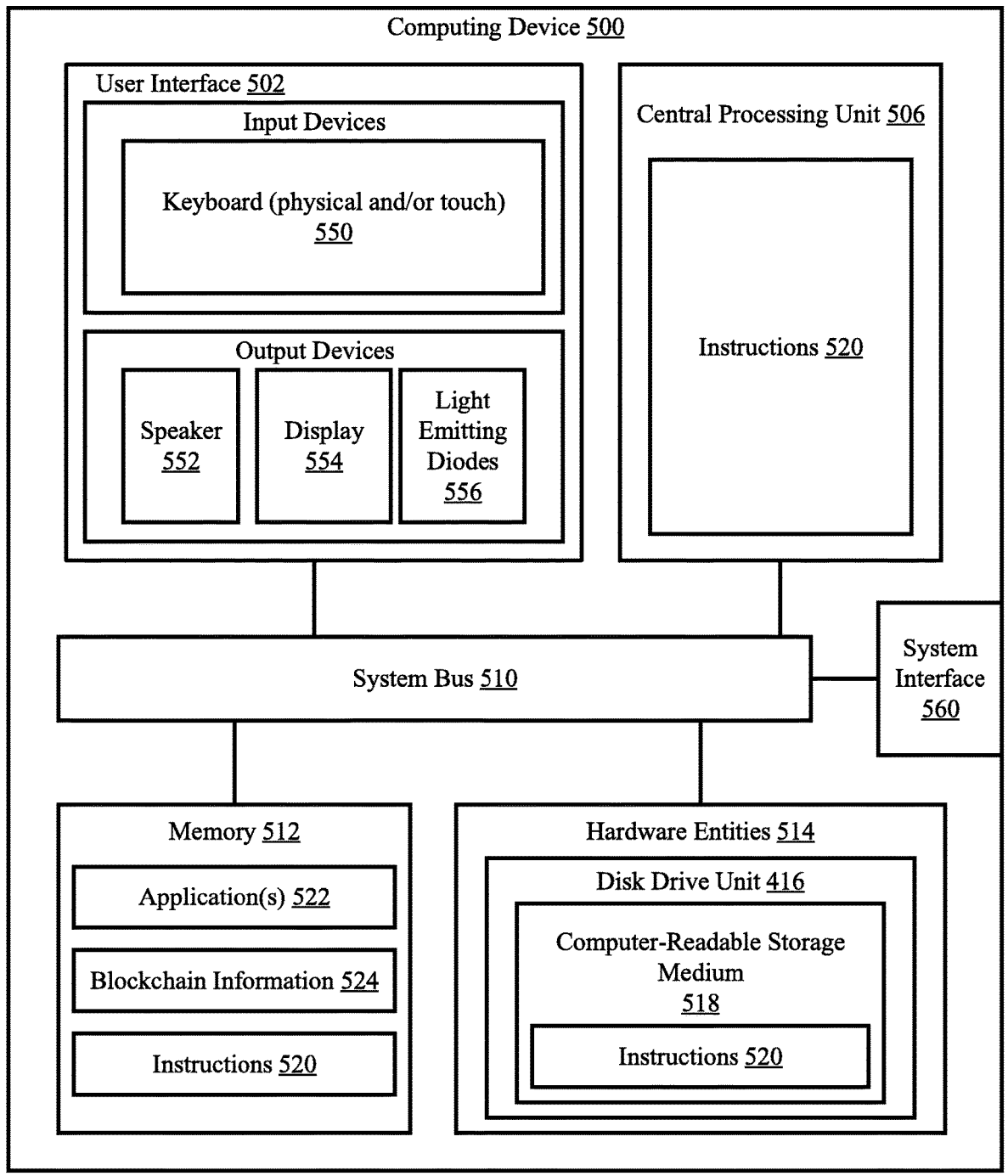
FIG. 5 is an illustration of an illustrative architecture for a computing device.

Referring now to FIG. 5, there is provided an illustration of an illustrative architecture for a computing device 500. Client device 202 and/or broker server 206 of FIG. 2 is(are) the same as or similar to computing device 500. As such, the discussion of computing device 500 is sufficient for understanding these components of system 200.

In some scenarios, the present solution is used in a client-server architecture. Accordingly, the computing device architecture shown in FIG. 5 is sufficient for understanding the particulars of client computing devices and servers.

Computing device 500 may include more or less components than those shown in FIG. 5. However, the components shown are sufficient to disclose an illustrative solution implementing the present solution. The hardware architecture of FIG. 5 represents one implementation of a representative computing device configured to provide an improved item return process, as described herein. As such, the computing device 500 of FIG. 5 implements at least a portion of the method(s) described herein.

Some or all components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, a system interface 560, and hardware entities 514 connected to system bus 510. The user interface can include input devices and output devices, which facilitate user-software interactions for controlling operations of the computing device 500. The input devices include, but are not limited, a physical and/or touch keyboard 550. The input devices can be connected to the computing device 500 via a wired or wireless connection (e.g., a Bluetooth® connection). The output devices include, but are not limited to, a speaker 552, a display 554, and/or light emitting diodes 556. System interface 560 is configured to facilitate wired or wireless communications to and from external devices (e.g., network nodes such as access points, etc.).

At least some of the hardware entities 514 perform actions involving access to and use of memory 512, which can be a Radom Access Memory ("RAM"), a solid-state or disk driver and/or a Compact Disc Read Only Memory ("CD-ROM"). Hardware entities 514 can include a disk drive unit 516 comprising a computer-readable storage medium 518 on which is stored one or more sets of instructions 520 (e.g., software code) configured to implement one or more of the methodologies, procedures, or functions described herein. The instructions 420 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 520 for execution by the computing device 500 and that cause the computing device 500 to perform any one or more of the methodologies of the present disclosure.

Computing device 500 implements blockchain technology. In this regard, computing device 500 runs one or more software applications 522 for facilitating the creation of blockchains (e.g., blockchain 300 of FIGS. 3-4), the storage of blockchain information (e.g., blockchain ledger 212 of FIG. 2, blockchain 300 of FIG. 3, and/or transaction block identifier) in a local memory 512 or a remote datastore 208 of FIG. 2, controlled access to broker resources in accordance with conventional broker based techniques when a broker server is online, and/or controlled access to broker resources in accordance with a blockchain based technique when a broker server is offline. Other operations and/or functions of software applications 522 are evident from other portions of this document. The present solution is not limited to the particulars of this example.

Figure 6:
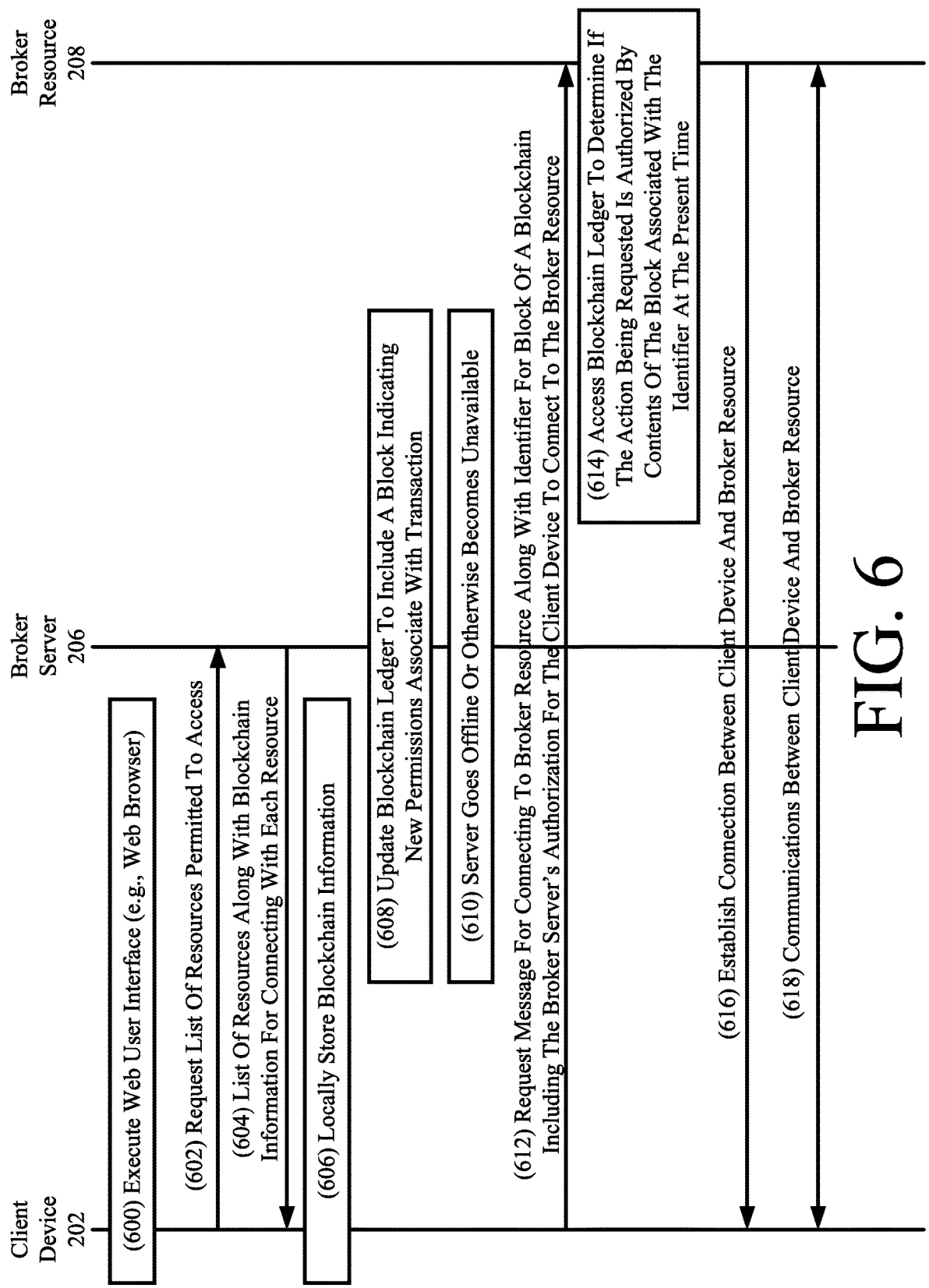
FIG. 6 is a message flow that is useful for understanding blockchain based control of a user's access to broker resources.

Referring now to FIG. 6, there is provided a message flow that is useful for understanding blockchain based control of access to broker resources. As shown in FIG. 6, the client device 202 executes a WUI (e.g., a Web Browser) in 600. WUIs and Web Browsers are well known in the art, and therefore will not be described herein. Any known or to be known WUI and/or Web Browser can be used herein without limitation. Next in 602, the client device 202 sends a request for a list of resources to the broker server 206. The resources identified in the list are those which a user of the client device 202 is permitted to access. An illustrative list of broker resources is provided below.

| List Of Broker Resources |
|---|
| 1: Virtual Desktop Agent |
| 2: Company Web Page |
| 3: Confidential Document |

In response to the request, the broker server 206 generates the list and sends the same to the client device 202 as shown by 604. Blockchain information for connecting with each broker resource identified in the list is sent to the client device 202 along with the list. The blockchain information can include, but is not limited to, one or more transaction block identifiers identifying transaction blocks of a blockchain (e.g., blockchain 300 of FIG. 3) which include information about the broker resources to which the user is permitted to access. For example, the blockchain information includes an identifier for a transaction block $304_N$ of the blockchain 300 shown in FIGS. 3-4. The identifier can be numeric, alphabetic, or alphanumeric. The present solution is not limited to the particulars of this example.

Since 602-604 represent a new transaction between the client device 202 and the broker server 206, the broker server performs operations in 608 to update the blockchain (e.g., blockchain 300 of FIG. 3). For example, the broker server 206 performs operations to add transaction data to the transaction block $304_N$, generate a hash of the transaction block $304_N$, and create a new transaction block $304_{N+1}$ (not shown in FIG. 3) including the hash of transaction block $304_N$. The transaction data includes resource identifiers for resources 1-3 identified in the above provided list of broker resources, a user identifier for the user of the client device, user permissions for the resources 1-3, use authorization durations for the resources 1-3 (e.g., resource 1 can be used for 2 hours, resource 2 can be used for 4 hours, and/or resource 3 can be used for 4 hours), and instructions how to establish a connection between the client device and each of the resources 1-3. The present solution is not limited to the particulars of this example.

Sometime thereafter, the broker server 206 goes offline (e.g., for maintenance) as shown by 610. As such, a blockchain based process is now used to provide the client device 202 controlled access to the broker resource 208. The blockchain based method is described by actions 612-616. 612 involves sending a message from the client device 202 to the broker resource 208, where the message includes a request for connecting thereto and an identifier for the transaction block (e.g., transaction block $304_N$ of FIG. 3) of the blockchain (e.g., blockchain 300 of FIG. 3) that includes information associated with the broker server's authorization for the user to access the broker resource (or stated differently, for the client device to connect to the broker resource). In response to the request, the broker resource 208 performs operations in 614 to access the blockchain ledger (e.g., blockchain ledger 212 of FIG. 2). The broker resource 208 uses the contents of the blockchain ledger to determine if the action being requested (i.e., establish a connection between client device 202 and broker resource 208) is authorized at the present time. For example, the broker resource 208 accesses the transaction data 410 contained in block $304_N$ of the blockchain 300. Based on the transaction data, the broker resource 208 determines that the user is authorized to access the same for a period of six hours starting from 9 AM this morning (which has not expired). Accordingly, the broker resource obtains the respective instructions from the transaction block for establishing a connection between itself and the client device. The present solution is not limited to the particulars of this example.

The instructions are then used in 616 to establish a connection between the client device 202 and the broker resource 208. Subsequently, communications are exchanged between these two devices, as shown by 618.

Figure 7:
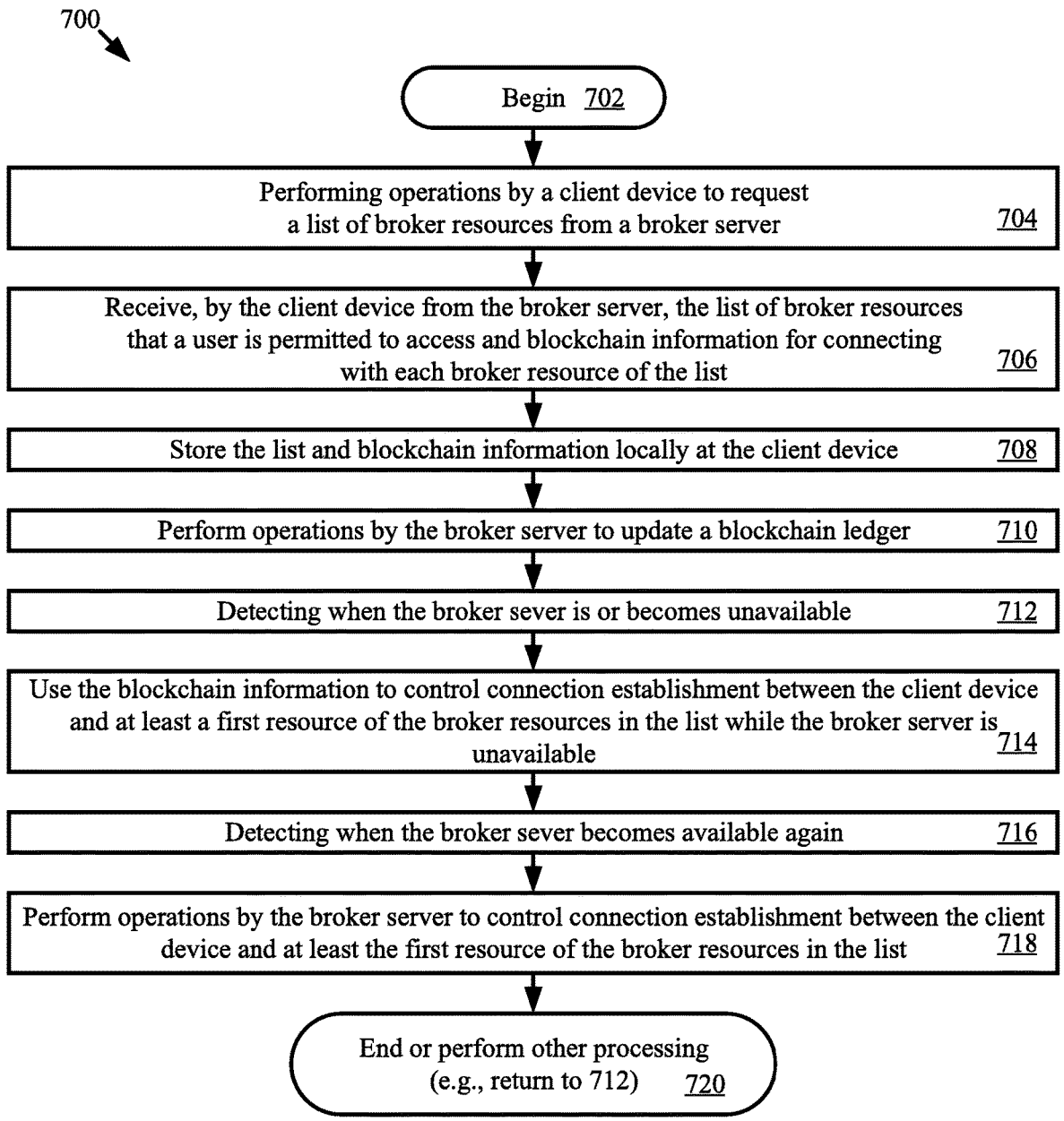
FIG. 7 is a flow diagram of an illustrative method for controlling access to broker resources.

Referring now to FIG. 7, there is provided a flow diagram of an illustrative method 700 for controlling access to broker resources. Method 700 begins with 702 and continues with 704 where a client device (e.g., client device 202 of FIG. 2) performs operations to request a list of broker resources from a broker server (e.g., broker server 206 of FIG. 2). In 706, the client device receives a list of broker resources from the broker server. The broker resources identified in the list includes those that a user is permitted to access. Blockchain information is also received by the client device in 706. The blockchain information includes information for connecting with each broker resource in the list. For example, the blockchain information comprises at least one identifier for a transaction block (e.g., transaction block 3041, 3042, 3043, . . . , or 304$_N$ of FIG. 3) of a blockchain (e.g., blockchain 300 of FIG. 3) which includes information about the broker resources which the user is permitted to use. The list and blockchain information is stored locally at the client device, as shown by 708.

In 710, the broker server performs operations to update a blockchain ledger (e.g., blockchain ledger 212 of FIG. 2). These operations involve updating a blockchain ledger to add transaction data (e.g., transaction data 410 of FIG. 4) to a transaction block in a blockchain, generating a hash for the transaction block (e.g., hash 406 or 414 of FIG. 4), and creating a new transaction block in the blockchain that includes the hash for the transaction block to which the transaction data was added. The transaction data comprises resource identifiers for the broker resources of the list, a user identifier for the user, user permissions for the broker resources of the list, use authorization durations for the broker resources of the list, and instructions how to establish a connection between the client device and each of the broker resources of the list.

Subsequently in 712, the client device detects when the broker server is or becomes unavailable. This detection can be made by: sending a message to the broker server; waiting for a response message from the broker server for a specified period of time; and determining that the broker server is unavailable when the response message is not received at the client device prior to the expiration of the specified period of time. When such a detection is made, the system (e.g., system 200 of FIG. 2) uses the blockchain information to control connection establishment between the client device and at least a first resource of the broker resources in the client while the broker server is unavailable. The connection establishment is controlled by: communicating a connection request from the client device to the first resource along with an identifier for a transaction block of a blockchain including the broker server's authorization for the client device to connect to the broker resource; and accessing a blockchain ledger stored in a remote datastore to determine of an action being requested is authorized by contents of the transaction block associated with the identifier at a present time. The connection is established between the client device and the first resource when a determination is made that the action being requested is authorized by contents of the transaction block associated with the identifier at a present time.

In 716, a detection is made when the broker server once again becomes available. This detection can be made by: sending a message from the broker server to the client device when it becomes available again; receiving the message at the client device; and/or communicating an acknowledgement message from the client device to the broker server. Thereafter in 718, the broker server performs operations to control connection establishment between the client device and at least the first resource of the broker resources in the list. Subsequently, 720 is performed where method 700 ends or other processing is performed (e.g., return to 712).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for controlling access to broker resources, comprising:
    obtaining, by a computing device, blockchain information for connecting with each broker resource identified in a list of broker resources that a user is permitted to access; and
    causing, by the computing device, use of the blockchain information to control connection establishment between a client device and at least a first resource identified in the list of broker resources, while a broker server is unavailable;
    wherein the blockchain information identifies a transaction block of a blockchain, the block chain comprising (i) a broker server block specifying a time of block creation and identifying the broker server, and (ii) the transaction block being linked to the broker server block and providing a record of a prior transaction between the client device and the broker server; and
    wherein the transaction block comprises a hash for a previous block in the blockchain, a timestamp indicating a time at which the prior transaction occurred, transaction data specifying access permissions granted to a given user by the broker server during the prior transaction, and connection lease information including connectivity details for the broker resources identified in the list of broker resources.

2. The method according to claim 1, wherein the transaction block further comprises information about the broker resources which the user is permitted to access.

3. The method according to claim 1, wherein the list of broker resources and the blockchain information are stored locally in the client device.

4. The method according to claim 1, further comprising:
    adding transaction data to the previous block in the blockchain;
    generating the hash for the previous block; and
    creating the transaction block.

5. The method according to claim 4, wherein the connection lease information comprises resource identifiers for the broker resources of the list, a user identifier for the user, use authorization durations for the broker resources of the list, and instructions how to establish a connection between the client device and each of the broker resources of the list.

6. The method according to claim 1, wherein the transaction block further comprises the broker server's authorization for the client device to connect to the broker resource.

7. The method according to claim 1, wherein the connection establishment is controlled by accessing a blockchain ledger stored in a remote datastore to determine whether an action being requested is authorized by contents of the transaction block at a present time.

8. The method according to claim 7, wherein the connection is established between the client device and the first resource when a determination is made that the action being requested is authorized by contents of the transaction block at a present time.

9. The method according to claim 1, wherein the list of broker resources is requested by the client device from the broker server.

10. The method according to claim 1, further comprising performing operations by the broker server to control connection establishment between the client device and at least the first resource of the broker resources identified in the list, when the broker server once again becomes available.

11. A system, comprising:
a processor;
a non-transitory computer-readable storage medium comprising programming instructions that are configured to cause the processor to implement a method for controlling access to broker resources, wherein the programming instructions comprise instructions to:
obtain blockchain information for connecting with each broker resource identified in a list of broker resources that a user is permitted to access; and
cause the blockchain information to be used to control connection establishment between a client device and at least a first resource identified in the list of broker resources, while a broker server is unavailable;
wherein the blockchain information identifies a transaction block of a blockchain, the block chain comprising (i) a broker server block specifying a time of block creation and identifying the broker server, and (ii) the transaction block being linked to the broker server block and providing a record of a prior transaction between the client device and the broker server; and
wherein the transaction block comprises a hash for a previous block in the blockchain, a timestamp indicating a time at which the prior transaction occurred, transaction data specifying access permissions granted to a given user by the broker server during the prior transaction, and connection lease information including connectivity details for the broker resources identified in the list of broker resources.

12. The system according to claim 11, wherein the transaction block further comprises information about the broker resources which the user is permitted to use.

13. The system according to claim 11, wherein the programming instructions further comprise instructions to cause the list of broker resources and the blockchain information to be stored locally in the client device.

14. The system according to claim 11, wherein the programming instructions further comprises instructions to cause a blockchain ledger to be updated by the broker server to add transaction data to the previous block in the blockchain, generate the hash for the previous block, and create the new transaction block.

15. The system according to claim 14, wherein the connection lease information comprises resource identifiers for the broker resources of the list, a user identifier for the user, use authorization durations for the broker resources of the list, and instructions how to establish a connection between the client device and each of the broker resources of the list.

16. The system according to claim 11, wherein the transaction block further comprises the broker server's authorization for the client device to connect to the broker resource.

17. The system according to claim 11, wherein the connection establishment is controlled by accessing a blockchain ledger stored in a remote datastore to determine whether an action being requested is authorized by contents of the transaction block at a present time.

18. The system according to claim 17, wherein the connection is established between the client device and the first resource when a determination is made that the action being requested is authorized by contents of the transaction block at a present time.

19. The system according to claim 11, wherein the programming instructions further comprise instructions to cause the list of broker resources to be requested by the client device from the broker server.

20. The system according to claim 11, wherein the programming instructions further comprise instructions to cause the broker server to control connection establishment between the client device and at least the first resource of the broker resources in the list when the broker server once again becomes available.

21. The method according to claim 1, further comprising:
adding transaction data to a last transaction block in the blockchain, when another transaction occurs between a client device and the broker server;
wherein the transaction data added to the last transaction block indicates that the particular broker server has revoked the access permissions that were granted to the given user during the prior transaction.

22. The method according to claim 1, further comprising using the timestamp of the transaction block to determine a specified period of time in which the user is permitted to access the first resource.

* * * * *